(12) United States Patent
Kahr et al.

(10) Patent No.: US 8,267,229 B2
(45) Date of Patent: Sep. 18, 2012

(54) RAILWAY BRAKE SHOE

(75) Inventors: Joseph C. Kahr, Southern Pines, NC (US); Timothy A. Rumph, Laurinburg, NC (US)

(73) Assignee: RFPC Holding Corp., Wilmerding, PA (US)

( * ) Notice: Subject to any disclaimer, the term of this patent is extended or adjusted under 35 U.S.C. 154(b) by 1009 days.

(21) Appl. No.: 11/943,266

(22) Filed: Nov. 20, 2007

(65) Prior Publication Data

US 2009/0127037 A1 May 21, 2009

(51) Int. Cl.
*F16D 65/04* (2006.01)
*F16D 69/00* (2006.01)

(52) U.S. Cl. ............ 188/251 R; 188/250 G; 188/250 B; 188/251 M

(58) Field of Classification Search .............. 188/250 R, 188/250 B, 251 R, 252, 255, 256, 258, 247, 188/248, 250 D
See application file for complete search history.

(56) References Cited

U.S. PATENT DOCUMENTS

| | | | |
|---|---|---|---|
| 995,067 A * | 6/1911 | Jones | 188/256 |
| 1,025,219 A * | 5/1912 | Thompson | 188/248 |
| 1,168,810 A | 1/1916 | Jones | |
| 1,403,855 A * | 1/1922 | Freeman et al. | 188/258 |
| 1,590,847 A * | 6/1926 | Moore | 188/251 R |
| 1,867,348 A | 7/1932 | Blume | |
| 1,907,635 A | 5/1933 | Winters | |
| 1,941,672 A * | 1/1934 | Fahrenwald | 188/255 |
| 2,096,430 A * | 10/1937 | Karr | 188/258 |
| 2,149,952 A * | 3/1939 | Birch | 188/248 |
| 2,162,770 A | 6/1939 | Wilson | |
| 2,215,572 A * | 9/1940 | Wilson | 188/256 |
| 2,254,950 A * | 9/1941 | Moore | 188/258 |
| 2,604,425 A * | 7/1952 | Batchelor et al. | 188/250 R |
| 2,748,902 A * | 6/1956 | Foster | 188/258 |
| 2,869,689 A | 1/1959 | Wilson | |
| 2,885,037 A | 5/1959 | Wilson | |
| 2,911,074 A | 11/1959 | Fraula et al. | |
| 2,948,361 A * | 8/1960 | Pogue | 188/251 R |
| 3,168,487 A | 2/1965 | Spokes et al. | |
| 3,751,330 A | 8/1973 | Gilbert | |
| 4,154,322 A | 5/1979 | Yamamoto et al. | |
| 4,781,275 A | 11/1988 | Olsen | |
| 4,977,986 A | 12/1990 | Edwards | |
| 4,991,697 A | 2/1991 | Hummel et al. | |
| 4,993,520 A | 2/1991 | Goddard et al. | |
| 5,161,654 A | 11/1992 | Valentin | |
| 5,182,166 A | 1/1993 | Burton et al. | |
| 5,310,025 A | 5/1994 | Anderson | |
| 5,356,702 A | 10/1994 | Harrison | |
| 5,407,031 A | 4/1995 | Christie | |
| 5,407,036 A | 4/1995 | Hummel et al. | |
| 5,413,194 A | 5/1995 | Kulis, Jr. et al. | |

(Continued)

FOREIGN PATENT DOCUMENTS

GB 495702 A 11/1938

(Continued)

*Primary Examiner* — Bradley King
*Assistant Examiner* — Thomas Irvin
(74) *Attorney, Agent, or Firm* — The Webb Law Firm

(57) ABSTRACT

A brake shoe without a metal backing has a metal insert comprising two spaced apart bodies, a connecting portion having a back face adjacent to the back surface of the brake shoe, and two generally parallel radially extending flanges integral with the connecting portion. The parallel extensions define a keyway, wherein when the brake shoe is emplaced on the brake head, the keyway extends through an opening provided in the brake head.

9 Claims, 5 Drawing Sheets

U.S. PATENT DOCUMENTS

| | | | |
|---|---|---|---|
| 5,560,453 A | 10/1996 | Conrad | |
| 6,241,058 B1 | 6/2001 | Shute et al. | |
| 6,279,222 B1 | 8/2001 | Bunker et al. | |
| 6,336,532 B1 | 1/2002 | Samolowicz | |
| 6,581,732 B1 | 6/2003 | Shute et al. | |
| 7,208,432 B1 | 4/2007 | Beier et al. | |
| 7,234,573 B2 | 6/2007 | Kurz et al. | |
| 2002/0053492 A1* | 5/2002 | Velayutha | 188/250 B |
| 2002/0079174 A1 | 6/2002 | Shute et al. | |
| 2003/0234142 A1 | 12/2003 | Shute et al. | |
| 2003/0234143 A1 | 12/2003 | Shute et al. | |
| 2004/0016608 A1 | 1/2004 | Gutowski | |
| 2006/0151268 A1 | 7/2006 | Kesavan et al. | |
| 2009/0139809 A1* | 6/2009 | Bowden et al. | 188/250 B |
| 2010/0032253 A1* | 2/2010 | Formolo | 188/251 R |
| 2010/0224453 A1* | 9/2010 | Kahr et al. | 188/251 R |
| 2011/0132705 A1* | 6/2011 | Rumph et al. | 188/234 |

FOREIGN PATENT DOCUMENTS

| | | |
|---|---|---|
| RU | 2253056 C1 | 5/2005 |
| RU | 2286273 C1 | 10/2006 |
| RU | 2286275 C1 | 10/2006 |
| UA | 6772 C1 | 12/1994 |
| UA | 26075 U | 9/2007 |
| UA | 95067 C2 | 7/2011 |
| WO | WO 2007/108785 A | 9/2007 |

* cited by examiner

RAILWAY BRAKE SHOE

BACKGROUND OF THE INVENTION

1. Field of the Invention

This application is directed to the art of composite railway brake shoes.

2. Description of Related Art

Rail cars are supported and guided by steel wheels. The treads at the outer circumference of the wheels ride over steel rails. Rail car brakes comprise brake shoes that are brought into frictional engagement with the wheel treads. The brake shoes are supported by brake heads which, in turn, are movably supported by the brake rigging comprised of a system of levers and a pneumatic cylinder. Brake shoes are comprised of various materials that are selected for their frictional characteristics and for the effect on the wear life of the wheel treads. Many brake shoes are composites of materials having different characteristics. In typical composite brakes shoes, materials of differing frictional characteristics bear upon the wheel tread during braking. This may be achieved by placing inserts of a different material into the friction face of the shoe comprised of the principal brake shoe material.

Standard railway brake shoes in North America are produced with metal backing plates for support of the friction material and for attachment and retention of the brake shoes to the brake heads. One type of railway brake shoe also includes a metallic insert solidly affixed by welding to the metal backing plate before the brake pad is formed, for example, by molding, onto the backing plate. See U.S. Pat. No. 6,241,058 entitled "Brake Shoe With Insert Bonded to Backing Plate." The brake shoe friction material often comprises a blend of abrasive materials, organic and inorganic filler materials, and resins. The metallic insert may be selected to provide beneficial treatment of the rolling surface of the wheel.

Elsewhere in the world, brake shoes are produced without metal backing plates and normally include a skeletal wire frame. As a result, it is difficult or not possible to obtain the benefits of a metal insert due to the lack of an adequate means for support and retention of the metal insert.

SUMMARY OF THE INVENTION

It is an advantage of this invention to provide a metal insert uniquely configured for use in brake shoes without metal backing plates and brakes shoes incorporating the metal insert. It is an additional advantage of this invention to provide metal inserts that may be used with brake shoes with and without wire frame supports.

Brake shoes have a friction surface which during braking bears on the convex rolling surface of the rail vehicle wheel. The rolling surface of the wheel is a surface of rotation that may be a convex-conical surface or a combination of convex-conical and cylindrical surfaces or other surfaces of rotation. The surface of the brake shoe has a concave surface of rotation that matches a portion of the convex surface of the wheel. These surfaces of rotation are defined by a generatrix (not necessarily straight line) rotated around an axis which is defined by the wheel axle. Thus, the friction surface of the brake shoe has a generally axial and a circumferential extent and the brake shoe has a radial thickness moving away from the friction surface. The features of the metal inserts and brake shoes according to various embodiments of this invention will be described herein with reference to the generally axial, circumferential and radial directions.

Briefly, according to one embodiment of this invention, a brake shoe without a metal backing is provided. The brake shoe is defined by a friction surface for bearing upon a wheel tread and an opposed back surface for being placed in contact with and secured to a brake head. The brake shoe has a metal insert comprising two spaced bodies having faces lying in the friction surface of the brake shoe. The spaced bodies extend radially away from the friction surface and to the back surface of the brake shoe. A connecting portion extends between the spaced bodies and has a face adjacent to the back surface of the brake shoe. Two generally parallel and radially extending flanges are integral with the connecting portion. The parallel extensions are sized to extend beyond the back surface of the brake shoe defining a keyway. When the brake shoe is emplaced on the brake head, the keyway extends through an opening provided in the brake head. The keyway provides a structure for securing the brake shoe to the brake head. The metal insert is embedded, as by molding, in the friction material.

According to a further embodiment, a bridge is provided across the radial ends of the parallel flanges of the insert to provide a closed keyway. According to yet another embodiment, the spaced bodies and the connection portion have openings therethrough for the passage of friction material. Thus, the friction material is not completely interrupted by the insert positioned between both circumferential (longitudinal) ends of the brake shoe thereby holding both ends together.

According to yet another embodiment, the brake shoe has a wire frame that cooperates with the metal insert to provide additional resistance to bending and cracking. The wire frame is configured so that the metal insert nests within the central portions of the wire frame. The wire frame has two cantilevered portions each of which extend circumferentially (laterally) from the metal insert. The wire frame has two short parallel sections that are positionable along the radial flanges. The short parallel sections are connected to cantilevered sections on the opposite side of the radial flanges. The configuration of the wire frame is illustrated in FIG. 13 of Application No. PCT/US2007/069854 published as WO 2008/150286 A1 Dec. 11, 2008 and also published as US 2010/0224453 Sep. 9, 2010 incorporated herein by reference. Arcuate sections at opposite ends of the metal insert connect the short sections and the cantilevered sections. The arcuate sections supporting different cantilevered sections cross and are welded together where they cross. The short sections and the arcuate sections form a nest for the metal insert. The metal insert and wire frame are embedded as by molding in the friction material. According to one embodiment, the wire frame may be welded to the metal insert.

According to a still further embodiment, a metal insert for a brake shoe is provided. The brake shoe is defined by a friction surface for bearing upon a wheel tread and an opposed back surface for being placed in contact with and secured to a brake head. The metal insert comprises a two spaced bodies having a friction faces for lying in the friction surface of a brake shoe. The two spaced bodies extend radially away from the friction face.

A connecting portion extends between the two spaced bodies and has a back face for being positioned adjacent to the back surface of the brake shoe. Two generally parallel radially extending flanges are integral with the connecting portion. The parallel extensions are sized for extending beyond the back surface of a brake shoe defining a keyway.

BRIEF DESCRIPTION OF THE DRAWINGS

Further features and other objects and advantages of this invention will become apparent from the following description of preferred embodiments made with reference to the drawings in which.

DESCRIPTION OF THE PREFERRED EMBODIMENTS

Referring now to FIGS. 1 to 4, there is shown an insert for a brake shoe without a metal backing. A brake shoe is defined by a friction surface for bearing upon a wheel tread and an opposed back surface for being placed in contact with and secured to a brake head. A metal insert 9 comprises two spaced apart bodies 10, 11 having friction faces 12 for lying in the friction surface of a brake shoe. The two spaced apart bodies 10, 11 extend away from the friction face 12.

Figure 1:
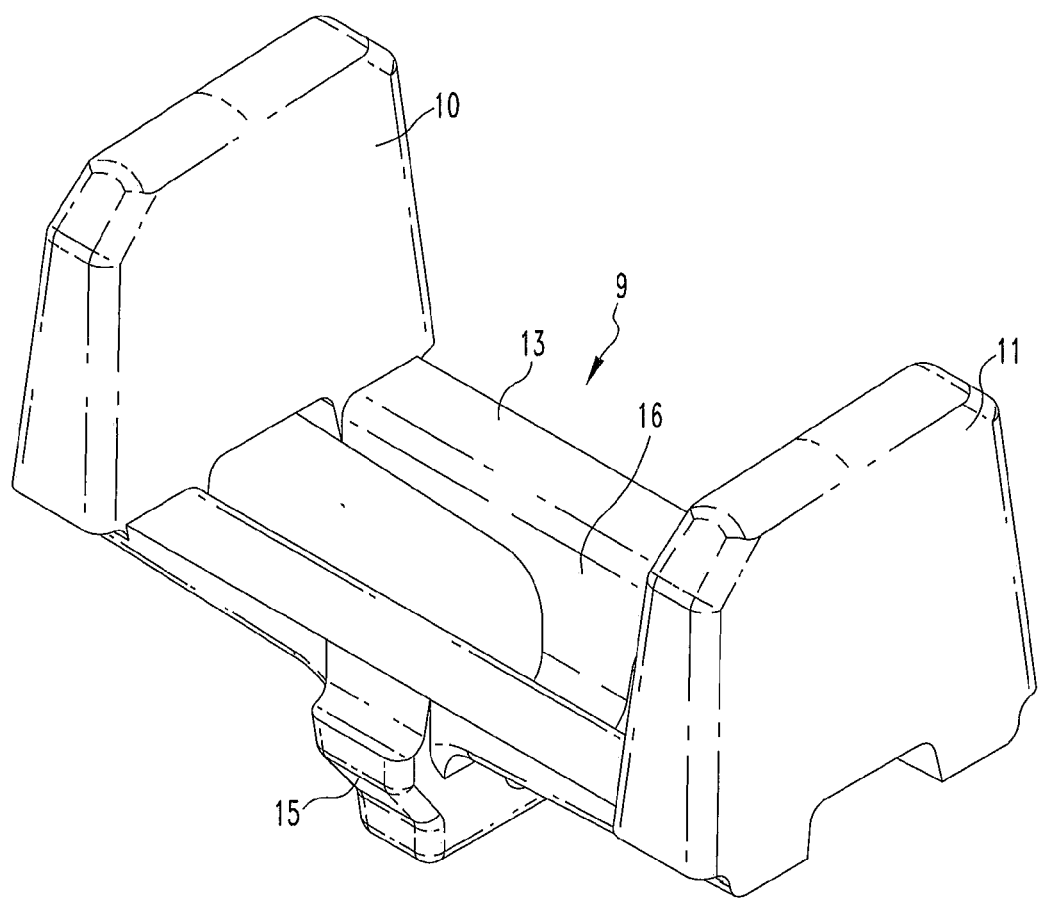
FIG. 1 is a perspective view of one embodiment of a brake shoe insert according to this invention.
Figure 2:
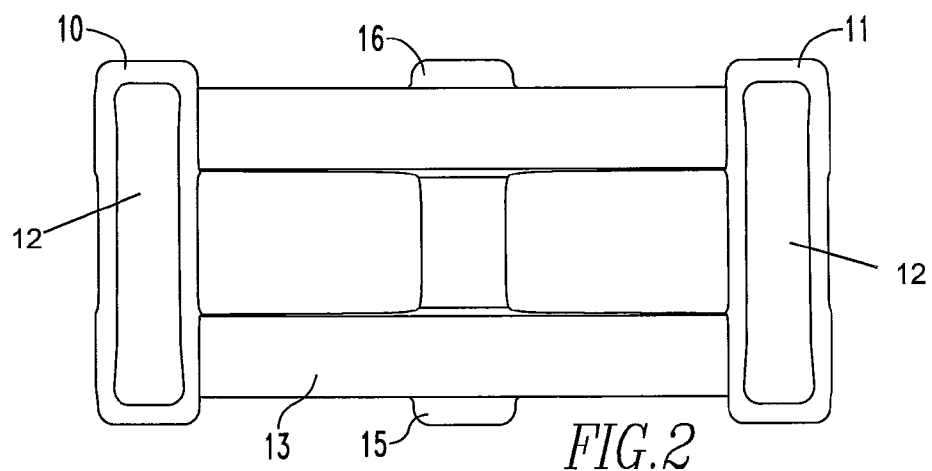
FIGS. 2, 3 and 4 are plan, elevation and side views, respectively, of the insert shown in FIG. 1.
Figure 3:
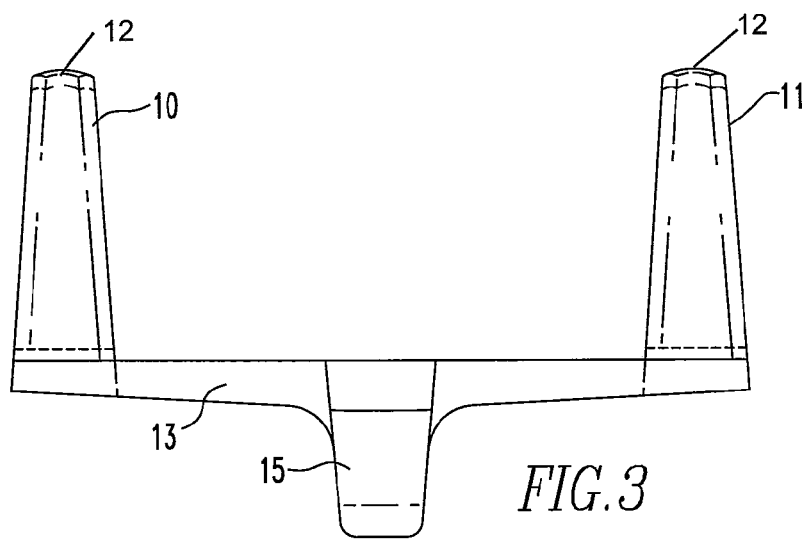
Figure 4:
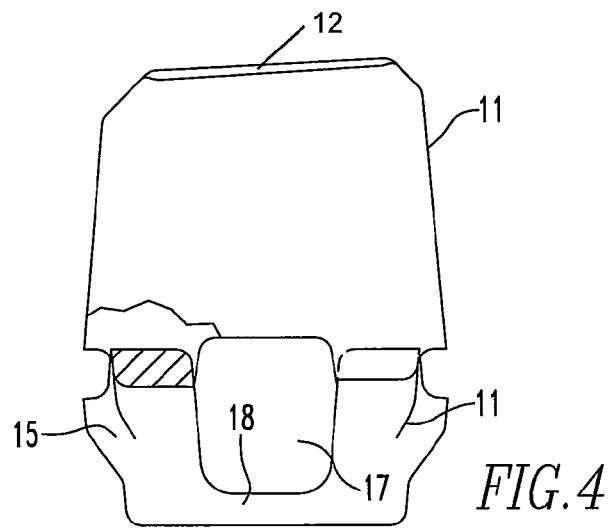
Figure 5:
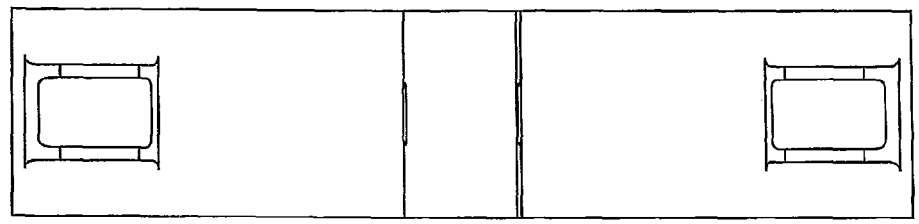
FIGS. 5, 6 and 7 are plan, elevation and bottom views of one embodiment of a brake shoe with a metal insert according to this invention.
Figure 6:
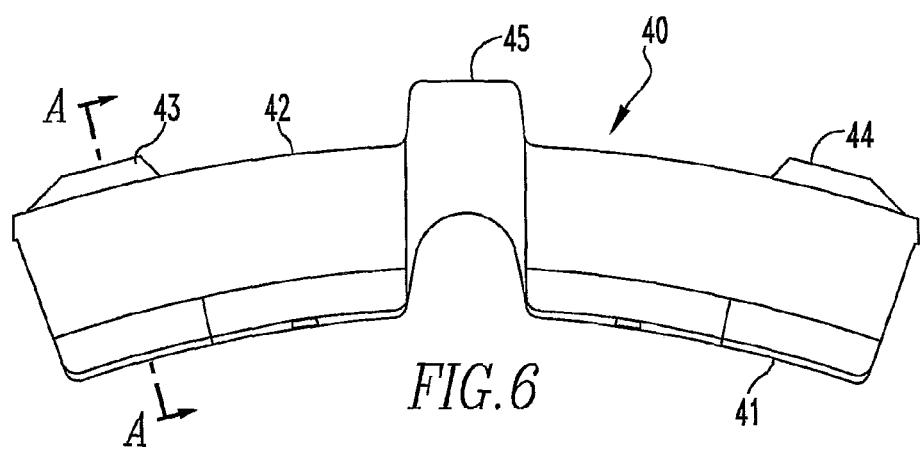
Figure 7:
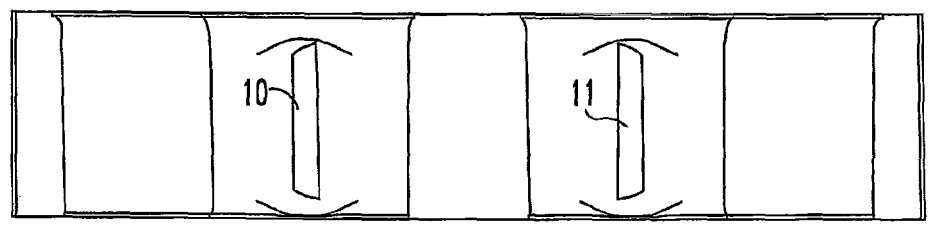
Figure 8:
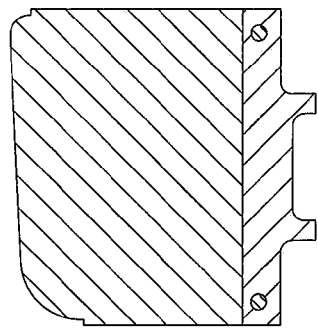
FIG. 8 is a section view taken along line A-A of FIG. 6.
Figure 9:
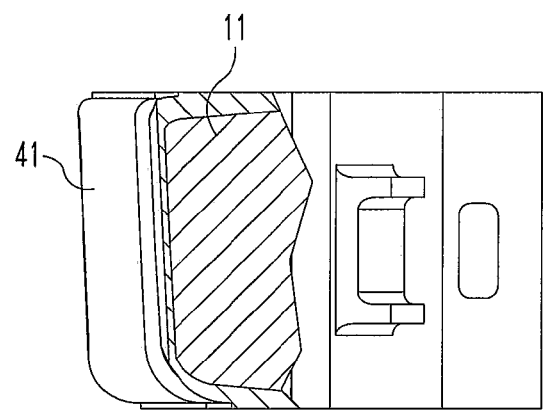
FIG. 9 is a broken out section view taken though the metal insert.

A connecting portion 13 extends between the two spaced bodies. The connecting portion has a back face for being positioned adjacent to the back surface of the brake shoe and providing brake head support. Two generally parallel radially extending flanges 15, 16 are integral with the connecting portion 13. The parallel flanges 15, 16 are sized for extending beyond the back surface of a brake shoe thus defining a keyway 17. As shown in FIG. 4 a bridge 18 extends between parallel flanges 15, 16 to enclose the keyway 17.

Referring now to FIGS. 5 to 9, a brake shoe with an embedded metal insert is described. A brake shoe 40 has a friction face 41 and a back face 42. The back face is shown to be cylindrical and the friction face conical. Extending from the back face are abutments 43 and 44 which are sized and positioned to enter openings provided in the face of the brake head (not shown). Also extending from the back face is an extension 45 comprising a stirrup that passes through an opening in the face of the brake head and which can be captured to hold the brake shoe to the brake head.

Figure 10:
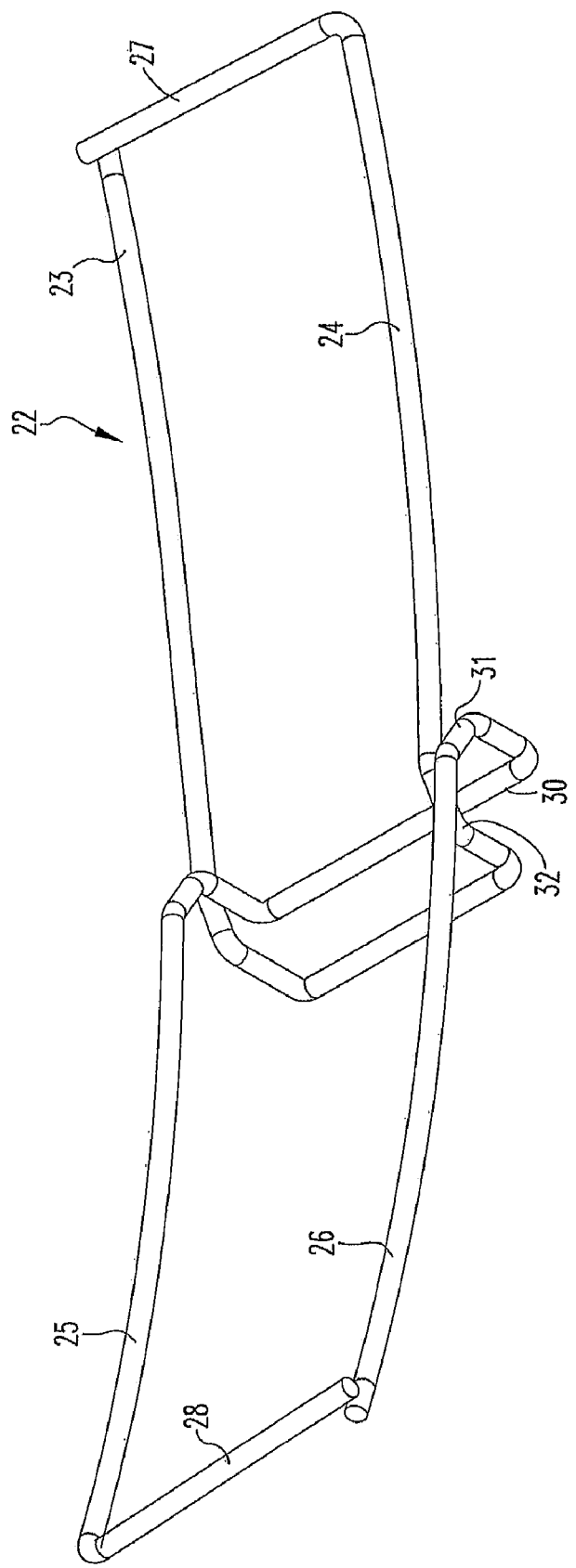
FIG. 10 is a perspective view of a wire frame to support the metal insert in the brake shoe.

Referring to FIG. 10, there is shown a wire frame 22. The wire frame has cantilevered legs 23, 24, 25, and 26 extending laterally outward from the main body of the insert generally in the plane of the wing-like extensions. The legs 23 and 24 are connected at the distal ends by a short leg 27. The legs 25 and 26 are connected at the distal ends by a short leg 28. At the proximal ends of legs 23, 24, 25, and 26 are the short legs 29, 30. The short legs 29, 30 are connected to pairs of legs 23, 24, 25, and 26 by arcuate legs 31, 32 (two of four shown) which provide resistance to rotation of the legs 23, 24, 25, and 26 away from the friction surface of the metal insert after the wire frame and insert have been embedded in the brake shoe. The arcuate legs supporting different cantilevered legs cross and are welded together where they cross. The short legs and the arcuate legs form a nest for the metal insert.

Brake shoes according to this invention are typically formed by molding friction material about the insert and an optional wire frame temporarily held in position in a mold. In one embodiment, the friction material may be added to the mold in one or more stages. Thus, the composition of the friction material may vary from the back to the friction face. The material at the back may be formulated for toughness or for strength and toughness whereas the wearable material of the friction face may be a different material selected for its friction characteristics and wear properties. A reinforcing mesh may be embedded near the back face of the brake shoe. After molding, the friction face may be machined to provide day one contact of the metal insert as well as the friction material.

The herein described embodiments of brake shoes with metal inserts are characterized by resistance to crack formation not withstanding that the metal inserts are not supported by a metal backing plate. Elimination of the backing plate and the welding operation simplifies the manufacture of the brake shoes without sacrificing the advantages of metal inserts.

Having thus described our invention in the detail and particularity required by the Patent Laws, what is desired protected by Letters Patents is set forth in the following claims.

The invention claimed is:

1. A brake shoe, comprising:
   a molded brake shoe body formed of friction material comprised of a blend of abrasive materials, organic and inorganic filler materials, and resins and defining a friction surface for bearing upon a wheel tread and an opposed back surface; and
   a single piece metal insert molded into the body and comprising at least two spaced apart bodies each comprising a friction face and a connecting portion extending between the at least two spaced apart bodies to connect the at least two spaced apart bodies, the connecting portion having a back face adjacent to the back surface of the brake shoe body;
   wherein the metal insert is molded into the brake shoe body such that the at least two spaced apart bodies and the connecting portion are initially embedded in the brake shoe body with the friction faces of the at least two spaced apart bodies lying in the friction surface of the brake shoe body for contact with the wheel tread upon wear of the friction surface; and
   wherein the connecting portion comprises at least one radially-extending flange extending beyond the back surface of the brake shoe body.

2. A brake shoe as claimed in claim 1, wherein the connecting portion comprises a pair of radially-extending flanges extending beyond the back surface of the brake shoe body.

3. A brake shoe as claimed in claim 2, further comprising a bridge connecting radial ends of the flanges.

4. A brake shoe as claimed in claim 3, wherein the bridge defines a closed keyway.

5. A brake shoe as claimed in claim 2, wherein the flanges are generally parallel to each other.

6. A brake shoe as claimed in claim 1, wherein the at least two spaced apart bodies define openings for passage of the friction material therethrough.

7. A brake shoe as claimed in claim 1, wherein the metal insert is nested in a wire frame having cantilevered legs extending away from the metal insert.

8. A brake shoe as claimed in claim 1, wherein the at least two spaced apart bodies define connected passages extending through the at least two spaced apart bodies and the connecting portion to permit the friction material to be continuous throughout the brake shoe body.

9. A brake shoe as claimed in claim 1, wherein the friction faces are generally rectangular-shaped.

* * * * *